United States Patent
Stacey et al.

[15] 3,698,094
[45] Oct. 17, 1972

[54] TILT METER

[72] Inventors: Frank Donald Stacey, Kenmore; John Munro William Rynn, Annerley, both of Australia; Eric Cooper Little, Moggill, Great Britain; Clyde Croskell, Taringa, Australia

[73] Assignee: The Universtity of Queensland, St. Lucia, Brisbance, Queensland, Australia

[22] Filed: Jan. 8, 1971

[21] Appl. No.: 105,102

Related U.S. Application Data

[63] Continuation of Ser. No. 758,720, Sept. 10, 1968, abandoned.

[52] U.S. Cl. .........................33/366, 73/398, 33/368
[51] Int. Cl. ...............................................G01c 9/22
[58] Field of Search....33/209, 206.5; 73/393, 398 C, 73/497, 125 T; 317/247

[56] References Cited

UNITED STATES PATENTS

| | | |
|---|---|---|
| 2,814,127 | 11/1957 | Blatchford...................33/209 |
| 2,532,883 | 12/1950 | Bennett et al. .............33/209 |
| 2,679,758 | 6/1954 | Lamb et al................73/363.9 |
| 3,140,613 | 7/1964 | Hasegawa....................73/393 |
| 3,225,599 | 12/1965 | Schwien...................73/398 C |
| 3,471,780 | 10/1969 | Beddows....................317/246 |
| 2,532,883 | 12/1950 | Bennett et al. .............33/209 |
| 2,679,758 | 6/1954 | Lamb et al................73/363.9 |
| 2,907,320 | 10/1959 | De Weese et al. ........73/398 C |
| 3,140,613 | 7/1964 | Hasegawa....................73/393 |
| 3,225,599 | 12/1965 | Schwien...................73/398 C |

OTHER PUBLICATIONS

Rawlings, A. L. The Theory of the Gyroscopic Compass, The MacMillan Company 1944, pp. 40- 52.

*Primary Examiner*—Leonard Forman
*Assistant Examiner*—Dennis A. Dearing
*Attorney*—Waters, Roditi, Schwartz & Nissen

[57] ABSTRACT

A tilt meter is provided with a horizontally disposed beam that supports on its underside a pair of spaced liquid containers. Insulated electrodes are supported and spaced above each liquid surface and connected to the underside of the beam. The liquids are electrically conductive. A first pipe is provided to communicate the liquid in one container with the liquid in the other container, and a second pipe is provided to communicate the space above each liquid surface with that space above the other.

13 Claims, 5 Drawing Figures

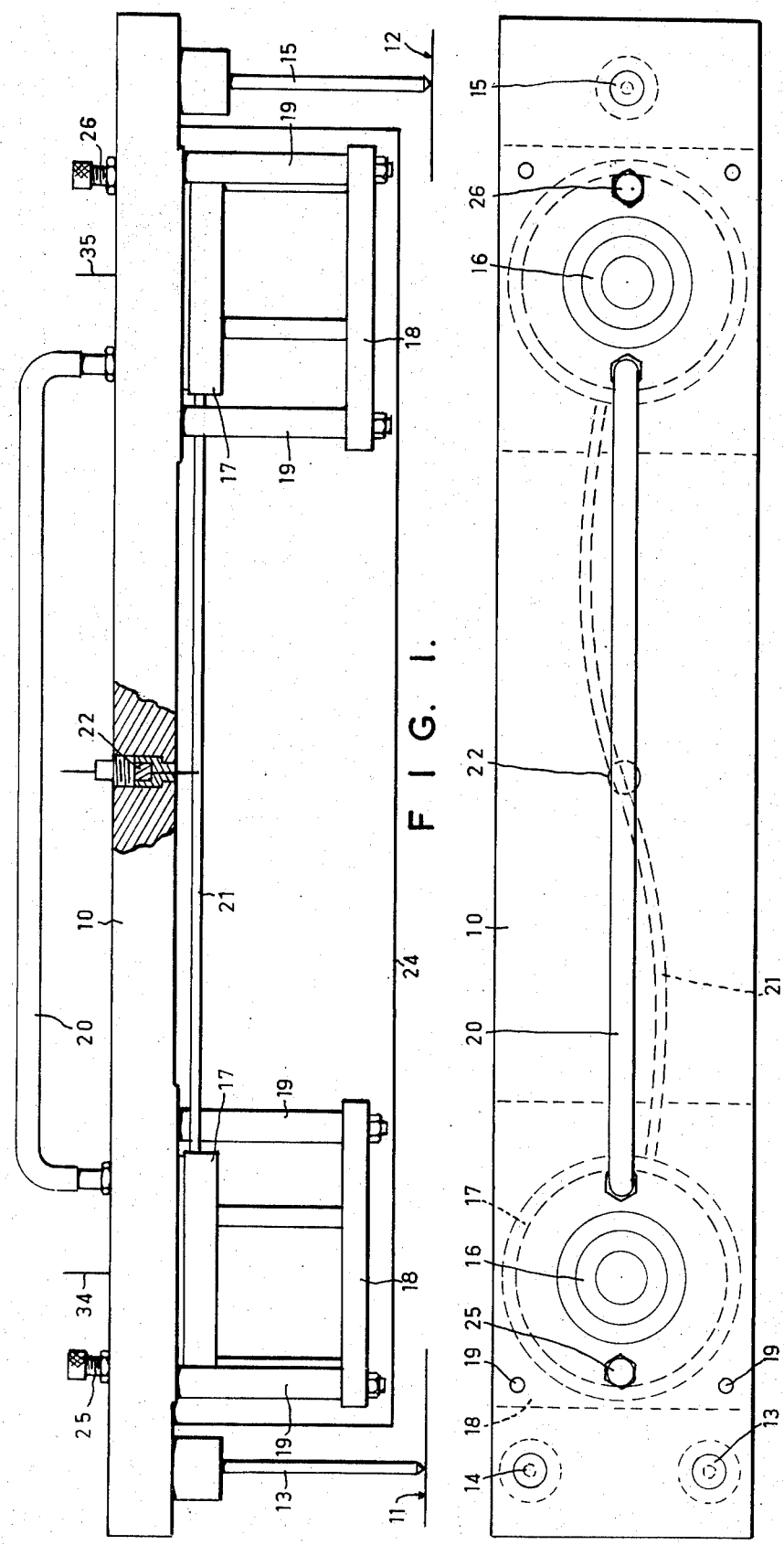
FIG. 1.
FIG. 2.
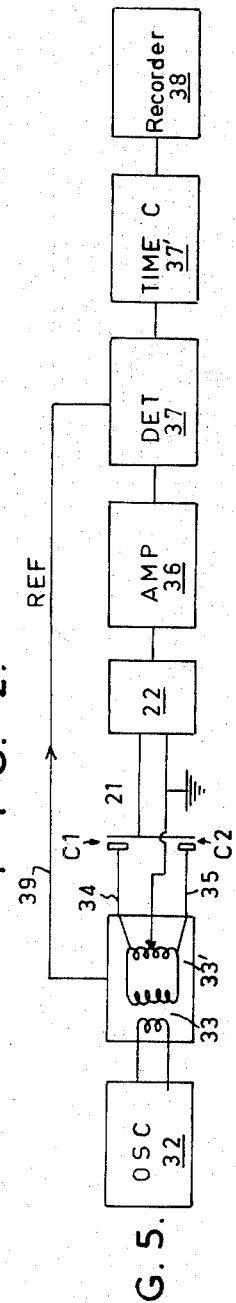
FIG. 5.

TILT METER

This application is a continuation of application, Ser. No. 758,720 filed Sept. 10, 1968 and now abandoned.

This invention relates to the measurement of tilt or departure from the horizontal of a surface or between two reference marks and is specifically directed to apparatus of extreme sensitivity.

Such tilt meters are necessary in geophysical work where the tilt with time of the earth's surface is to be measured.

It is an object of this invention to provide apparatus with a sensitivity of the order of $10^{-7}$ to $10^{-9}$ radians.

It is a further object to provide such apparatus in a portable form.

The invention uses the principle of measuring tilt between two spaced reference surfaces by comparison of the capacities between a liquid surface and electrodes mounted on a rigid member supported on said surfaces.

Accordingly, the invention comprises a tilt meter for measuring tilt between two spaced reference surfaces, including a support contacting each said surface, a rigid member supported between said supports, at least one container attached beneath said rigid member, insulated electrodes attached at spaced positions on said rigid member above said containers, a conducting liquid in said container, the surface of said liquid lying below each said electrode, and electrical means indicating the ratio of capacities between said surface and the respective electrodes.

Preferably the container is in the form of two pools, one below each electrode, having a liquid connection between them.

The container or each pool may be sealed to said member to prevent spillage of the liquid during transport or displacement of the member.

Compensation may be provided to prevent variations in temperature from affecting the capacity ratio.

In order that the invention may be better understood it will be discussed with reference to the accompanying drawings of exemplary arrangements, in which:

FIG. 1 shows a, partly broken away, side view of one form of the apparatus,

FIG. 2 shows a plan view of the apparatus of FIG. 1,

FIG. 5 shows a block circuit of the electrical system used.

Figure 3:
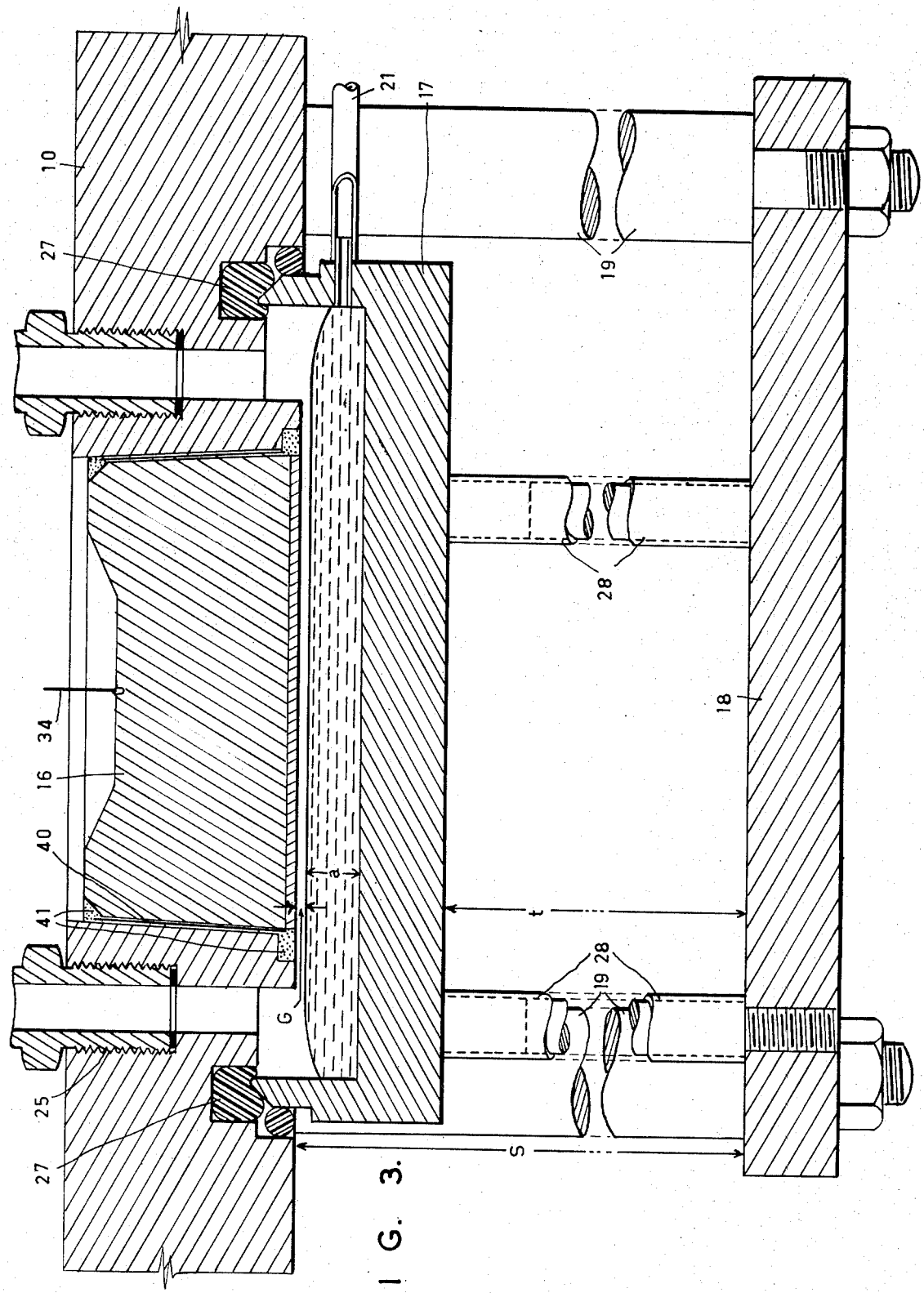
FIG. 3 shows, in enlarged scale, a section through one of the electrode and pool assemblies of FIG. 1.

Referring first to FIGS. 1 and 2, a rigid member comprising a bar or beam 10, preferably of stainless steel, is mounted on the reference surfaces 11, 12 on supports comprising fixed legs 13, 14 contacting surface 11 and a single leg 15 contacting surface 12. Bar or beam 10 has insulated electrodes 16 mounted at spaced positions along its length.

On the lower surface of beam 10 beneath electrodes 16 is a liquid container comprising separate pools 17 for containing mercury connected by a pipe 21.

Each pool is mounted on a base-plate 18, supported from the beam 10 by pillars 19. As will be described below, temperature-compensation means are provided in the pool assembly.

Nitrogen or other inert gas lies above the mercury in the pools 17 to prevent oxidation.

A nitrogen tube 20 connects the spaces above the mercury in pools 17, and tube 21 connects the bodies of mercury in the pools. The tubes 20, 21 are curved (FIG. 2) to avoid straining the pools 17, and the bore of tube 20 is made such that oscillation of mercury is critically damped.

The apparatus functions generally by comparing the capacities between the mercury surface level in pools 17 and the respective electrodes 16, to measure the tilt of beam 10. A ratio-transformer bridge circuit is used (as will be later explained), a pre-amplifier 22 being mounted on the beam and connected to the mercury in line 21. A heavy metal shield 24 attached to the beam electrically shields the apparatus.

Various features of the apparatus will now be described in more detail.

THE MERCURY SYSTEM

The diameter of the mercury surface in pool 17 must be large enough to provide a substantially flat portion below each electrode 16, in spite of curvature at its edges.

In general, the expression for the height $y$ measured downwards from the height at the center of a circular surface is given for radius $x$ as:

$$Po + rgy = S(\cos\theta \, d\theta/dx + 1/x \sin\theta)$$

where
  $Po$ = Pressure inside the surface at the center
  $r$ = density of Hg
  $g$ = acceleration due to gravity
  $S$ = surface tension of Hg
  $\theta = \tan^{-1}(dy/dx)$ Except very near the pool edge $\theta << 1$ and the equation simplified to:

$$(d^2x/dy^2) + (1/y)\cdot(dx/dy) - Bx = 2C$$

where $C = Po/2S$ and $B = rg/S = 2.8 \times 10^5 \cdot m^{-2}$

There is a simple series solution:

$$y = \frac{C}{2B}\left[Cx^2 + \frac{(Cx^2)^2}{4^2} + \frac{(Cx^2)^4}{4^2 6^2} + \cdots\right]$$

In the range of interest ($x < 2.5$ cm, $Cx^2 < 200$), $y$ is very close to an exponential dependent on $x$:

$$y = A^1 \exp(510\, x)$$

Where $A^1$ is a constant including $A$ and determined by the boundary conditions at the pool edge where $dy/dx = 1$ and and $x = D/2$ (D is the pool diameter). For $D = 8$ cm, $A^1 = 2.7 \times 10^{-10}$ cm and at $x = 2.5$ cm (i.e., at the edge of an electrode of 5 cm diameter), $y = 2 \times 10^{-5}$ cm. This about $2 \times 10^{-y}$ of the mean capacitance gap G, and is of negligible effect on the readings.

Similarly, other relative diameters of the electrode and the pool may be calculated to give substantial flatness. The formula is obviously applicable for liquids other than mercury.

The depth of mercury in pools 17 is kept as small as possible to minimize the effect of thermal expansion, but the minimum depth is limited by the requirement that capillarity should not prevent complete and automatic refilling of the tube 21 after emptying.

This minimum depth from the mercury surface to tube 21 is given by:

$$h = (4 S \cos A)/(rgd)$$

where $S$ = surface tension of Hg,
$r$ = density of Hg,
$g$ = acceleration due to gravity,
$d$ = bore of tube 21,
$A$ = angle of contact of Hg (for stainless steel pool, $A$ =32°)

For $d$=2.6mm, $h$ is 6mm.

The bore of mercury tube 21 is chosen to give the desired hydraulic response; for most purposes the condition for critical damping is required. This is given by:

$$d^6 = (128 n^2 lD^2)/(g r^2)$$

where
$n$ = viscosity of Hg,
$l$ = length of tube 21,
$D$ = diameter of pools 17,
and $g$, $r$ and $d$ as before.

For $l$ = 40cm, $D$ = 8cm, $d$ is about 2.3mm.

This gives a hydraulic response time of about 4 seconds which is sufficiently short for the instrument to respond well to seismic waves.

With the accuracies involved, it is necessary to prevent any oxidation of the mercury and ensure that the pressures above it in pools 17 be equal. A dry, oxygen-free nitrogen (or other inert gas) filling is used and nitrogen tube 20 ensures equal pressures. Filling of pools 17 with mercury is effected by sealable fillers 25, 26, through which the nitrogen atmosphere may also be introduced. By introducing a gas flow at 25 to emerge at 26 the system can be flushed to ensure removal of all air and oxygen.

TEMPERATURE COMPENSATION

The gap G between the mercury surface and an electrode 16 should be kept at constant temperature for the range of ambient temperatures over which the instrument is required to operate.

This may be accomplished by using the different temperature coefficients of expansion of different materials.

Referring to FIG. 3, pool 17 is sealed to the beam 10 by a low-dielectric resilient material (such as silicone rubber) at 27 so that it may move slightly with respect to beam 10.

The gap G depends on the expansion coefficients of the stainless steel spacers 19, silica pillars 28 and the mercury in pool 17. For a constant G:

$$t = \frac{a_{Hg} - 3a_s}{a_s - a_{si}} \left( a + \frac{l}{2} \frac{d2}{D2} \right) - G \frac{a_{si}}{a_s}$$

Where $a_{Hg}$, $a_s$ and $a_{si}$ are the volume expansion coefficient of mercury and the linear coefficients of stainless steel, and silica respectively,
$D$ is the diameter of pool 17,
$t$ is the length of pillars 28,
$a$ is the depth of Hg,
and $l$, $d$ are the length and bore of tube 21.

If $D$ = 8cm, $a$ = 6mm, $G$ = 1.0mm, $l$ = 33.5cm, $d$ = 2.3mm then $t$ = 4.63cm.

It will be appreciated that expansion of spacers 19 tends to increase gap G, while expansion of pillars 28 tends to decrease it.

Similarly increase of temperature expands the mercury in container 17, tending to reduce the gap and expands the container itself tending to increase it. Using the relation given above, these factors cancel to give a constant G.

The length $S$ of spacers 19 is about 6.2cm.

It is clear that a similar relation holds for materials other than stainless steel, silican and mercury.

Error in temperature compensation may arise from error in $a_s$, but even allowing an error of 6 percent in this (10 times the quoted tolerance), the spurious tilt per °C. is $4 \times 10^{-7}$ $(R - 0.5)$ where $R$ is the ratio-transformer reading at balance ($0<R<1$). For high-sensitivity measurements, $(R - 0.5)$ is arranged to be less than $10^{-3}$, so the error per °C. is not greater than $4 \times 10^{-10}$ radian.

Figure 4:
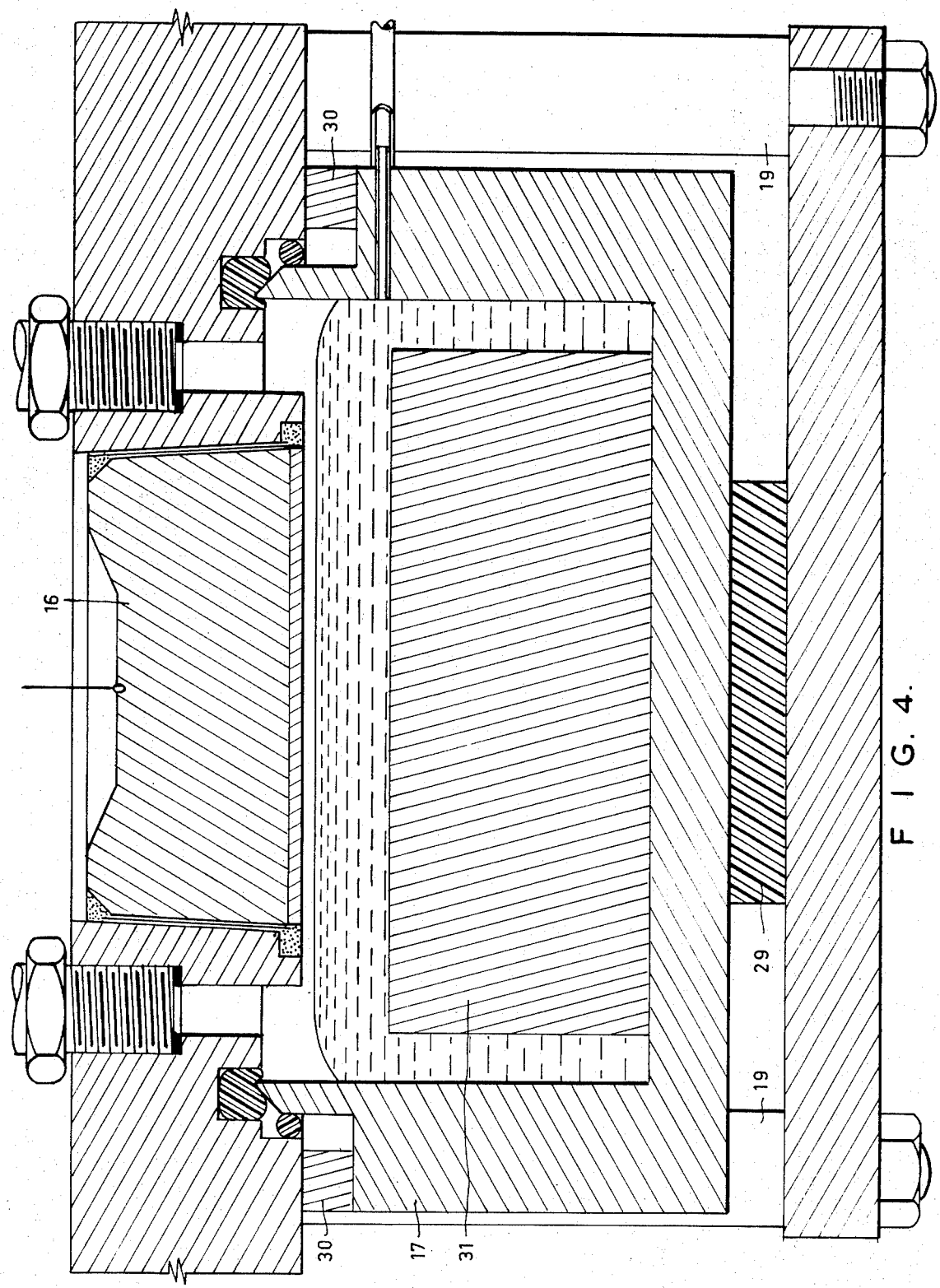
FIG. 4 shows a modification of the arrangement of FIG. 3.

A similar temperature-compensation effect may be obtained with the modification shown in FIG. 4.

Here circular pool 17 is mounted on a resilient block 29 on base-plate 18 and spaced from beam 10 by silica spacers 30. Its position is unaffected by temperature expansion of spacers 19 and its upper edge position is governed by silica spacers 30.

A cylindrical silica block 31 of diameter $D_{si}$ and height $h_{si}$ is immersed in the mercury.

By suitably dimensioning the length $b$ of spacers 30 and diameter and height of the block 31, a temperature rise dT causes an increase in the dimension $(m + b)$ equal to the rise in mercury level, so keeping gap width G constant.

Thus $(m \cdot a_s + b \cdot a_{si}) dT$ $$= \frac{1}{\frac{\pi}{4} \cdot D^2} \text{ (Volume change of Hg and Si relative to steel)}$$

$$= \frac{1}{\frac{\pi}{4} \cdot D^2} \left\{ \frac{\pi}{4} \cdot D_{si}2 \cdot h_{si} \cdot 3a_{si} \right.$$

$$+ \left( \frac{\pi}{4} \cdot D^2 \cdot a + \frac{1}{2} \cdot \frac{\pi}{4} \cdot d^2 \cdot l - \frac{\pi}{4} \cdot D_{si}2 \cdot h_{si} \right) a_{Hg}$$

$$\left. - \left( \frac{\pi}{4} D^2 \cdot a + \frac{1}{2} \frac{\pi}{4} d^2 \cdot l \right) 3a_{ss} \right\} dT$$

where
$m$ = depth of pool side below spacer 30
$b$ = length of spacer 30
and, as before,
$D$ = diameter of pool 17
$D_{si}$ = diameter of block 31
$h_{si}$ = height of block 31
$a$ = depth of Hg
$G$ = gap between Hg surface and electrode 16.
$d,l$ = bore and length of tube 21
but $a = m + b - G$
So the requirement is
$$m \cdot a_s + b a_{si} = (m + b - G + 1/2 \ (d/D)^2 \cdot l) \ (a_{Hg} - 3a_s)$$

$$- [(D_{si})/D)]^2 \cdot h_{si} \cdot (a_{Hg} - 3a_{si})$$

This enables temperature-compensation to be calculated for any given conditions.

A temperature difference between the ends of beam 10 as small as $10^{-3}$° C. at highest sensitivity may give a significant spurious tilt reading.

The bridge comparison and pool temperature compensation however allow an overall length of beam only of the order of 50cm to be used. The instrument is therefore small enough to be completely enclosed in thermal shields (not shown) when installed.

The high thermal conductivity and shortness of the beam 10 promotes rapid temperature equalization between its ends, so that effective heat shielding is easily obtained.

THE LEG MOUNTINGS

Beam 10 is mounted on legs 13, 14, 15 which engage on prepared rock surfaces 11, 12. These surfaces are normally prepared to give an initial horizontal beam position with the fixed legs shown.

However, the legs may be made slightly variable in length either by screw adjustments, or by mounting the single leg 15 on a micrometer-controlled lever for very fine adjustment. These modifications are, however, not shown in the drawings.

It is important that the precise points on which the legs rest remain the same in spite of any expansion or contraction of the beam 10 or the rock.

Legs 13, 14, 15 are therefore made sufficiently flexible to accommodate such movements without frictional sliding of the points of support.

Assuming a circular leg of length $L$, diameter $x$ and Youngs modulus $q$, supporting a mass $M/2$ with a coefficient of friction $u$, the sliding thereof is prevented if:

$$x < \left(3.4 \frac{MguL^3}{qalT}\right)^{\frac{1}{4}}$$

where
  $l$ = length of beam
  $a$ = temperature coefficient of beam
  $T$ = temperature rise or fall
  $g$ = gravitational acceleration Taking extreme conditions where $T = 50°C.$, $u = 0.5$ and $a = 2 \times 10^{-5}$ per °C., then with $l = 50cm$, $M = 10$ Kg; $L = 8cm$, $x = 0.5cm$ there results the required condition.

The tips of legs 13, 14, 15 are preferably made sharp so that the beam may be levelled by lightly tapping it.

ELECTRICAL

FIG. 5 shows in block form the electrical circuit of the instrument, which compares the capacities between the electrodes 16 and the mercury surface in pools 17 by means of a ratio-transformer bridge (A.M. Thomson: IRE Trans on Instr 1-7 (3 and 4) p. 246-253).

An oscillator 32 through input transformer 33, feeds a ratio-transformer $33^1$ which is connected to electrodes 16 via leads 34, 35 (see also FIG. 1). The mercury (acting as the other electrode of the capacities C1, C2) is connected to the input of a high-impedance preamplifier 22 mounted in a recess on the beam 10 (FIG. 1). Output from 22 is fed via amplifier 36 to detector 37 and recorder 38.

The ratio-transformer gives a voltage ratio accurate to about 1 part in $10^7$ against environmental changes when supplied from oscillator 32 at about 2 - 3 KHz. and 5 ohms source impedance.

In one system of operation, the ratio is adjusted (by five decade dials plus a potentiometer for sixth and seventh decades) to a null reading sensed by detector 37.

In this operation, many readings are necessary to give a time versus tilt record, but the system is free of error due to extraneous conditions, such as power supply or oscillator amplitude and frequency variations, gain in amplifiers 22, 36 etc.

A more usual system of operation is to set the ratio-transformer to an arbitrary reference zero and record the off-balance signal versus time.

Such unbalanced operation places restrictions on the electronic equipment, as follows:

Oscillator 32 must be of constant amplitude. If an inductor is used from trough to ground, as it may be to increase sensitivity, oscillator frequency must also be constant. The output impedance of input transformer 33 must be low, so that output does not vary with load variation due to tilt.

The D.C. output of detector 37 must exactly represent the A.C. input. A synchronous detector fed by reference voltage via lead 39 from the A.C. source is ideal, giving opposite polarity of output for tilt variations in opposite sense.

The gain of amplifiers 22 and 36 must be constant.

The input impedance of 22 should be high, and the preamplifier 22 may with advantage use field effect transistors.

The power-supply to the equipment will normally be stabilized.

If the ratio of the two parts of transformer $33^1$ is $R$ : $(1-R)$, where $0 < R < 1$ $(R)/(1-R) = (C11/C2) = (d2/d1)$ since capacitance is unversely proportional to gap width ($d1$ or $d2$). Also the tilt angle $\theta = (d1 - d2)/(L)$ where $L$ = distance between electrodes 16

$$\theta = (d1 + d2)/(L) \cdot (d1 + d2)/(d1 + d2) = (D/L)(2R-1)$$

$= (2D/L)(R-0.5)$ where $D = d1 + d2 =$ a constant.

Thus the reading of the ratio-transformer is linear with tilt to a high degree of first-order accuracy, the maximum error being of the order of 0.05 percent of the reading.

By choosing L and D, direct readings in radians may be obtained from the dial settings of transformer $33^1$. For $D = 2mm$, $L = 40cm$; tilt = $(R - 0.5) \times 10^{-2}$ radians.

A time-constant circuit $37^1$ in the output of detector 37 gives a cut-off at about 1c.p.s., and removes the effect of ripples or other short-term disturbances on the mercury surface.

The peak potentials applied between an electrode 16 and the mercury surface must be low enough not to disturb that surface by electrostatic attraction. At balance (i.e., equal capacitor gaps) the effect is partly compensated, but, when out of balance, the bridge voltage (V) should not exceed a value given by:

$$V^2 = (2 G^2/e_o) \cdot rg (dG)$$

where
  $G$ = electrode gap
  $e_o$ = permittivity
  $r$ = density of Hg
  $g$ = gravity acceleration
  $dG$ = maximum deflection of Hg surface With a maximum tolerable spurious tilt of $10^{-9}$ radian on a baseline of 40cm, $dG$ is $4 \times 10^{-6}$ cm and $V = 3$ volts rms.

Since neither the electrodes 16 or pools 17 are at earth (beam) potential, a stray capacities should be minimized and made equal. The shield 24 (FIG. 1) is symmetrical with respect to the pool-electrode systems and has as much clearance from these systems as possible.

Each electrode 16 is insulated from beam 10 by a fluon or like sleeve 40 (FIG. 3) sealed top and bottom by epoxy resin at 41, and each pool 17 is spaced from the beam at 27 by a silicone rubber or like low-dielectric seal.

What is claimed is:

1. A tilt-meter comprising a rigid bar having a lower surface, said bar being of a material having high heat conductivity; support means on said bar for resting the bar on a reference surface whose horizontality is to be determined; a pair of spaced containers; means securing the containers to said bar beneath said lower surface of said bar; an electrically conductive liquid partly filling each of said containers to a predetermined level and providing a flat liquid surface in said containers; liquid-tight sealing means between said containers and said lower surface of said bar; electrodes supported by said bar at a predetermined height above the liquid level in said containers to define a gap of predetermined width between said electrodes and the liquid; insulating means electrically insulating said electrodes from said bar; a fluid medium contained within the gaps to normally maintain a constant pressure between said electrodes and the liquid and to prevent oxidation thereof; a first pipe interconnecting said containers for communication of the liquid from one container to the other in response to tilting of the bar and containers; sealable filling means above the level of the liquid in said containers for effecting filling of said electrically-conductive liquid into said containers and filling of said fluid medium into said gaps and arranged to maintain a closed circulation system between said containers; electrical bridge means for indicating the ratio of capacities between the surface of said liquid in each container and its respective electrode, said bridge means including a ratio-transformer constituting two arms of said bridge, said capacities constituting the remaining arms; an oscillator; low-impedance means electrically coupled with said oscillator and bridge means for feeding input voltage to said bridge means; and adjustable detector means between said transformer and said capacities for establishing balance in the bridge to enable determination of any angle of tilt of the bar and thereby of said reference surface in direct proportion to the setting of the ratio transformer, said means securing the containers to the bar comprising temperature compensation means coupled with each container for adjusting the position of the container with respect to the bar to maintain constant gap width between the electrodes and the liquid in the container for different ambient temperatures.

2. A tilt-meter as claimed in claim 1 in which said input voltage has an amplitude of less than $$\sqrt{\frac{2G^2}{e_o} \cdot rg \cdot dG}$$

where
$G$ = electrode to liquid surface gap
$e_o$ = permittivity of the gap
$r$ = density of the liquid
$g$ = acceleration due to gravity
$dG$ = is the maximum allowable deflection of the liquid surface due to electrostatic attraction.

3. A tilt-meter as claimed in claim 1, wherein said electro-conductive liquid is mercury.

4. A tilt-meter as claimed in claim 1, wherein said fluid medium is an inert gas.

5. A tilt-meter as claimed in claim 1, wherein said fluid medium is nitrogen.

6. A tilt-meter as claimed in claim 1, wherein said pair of containers each includes an upper edge engaging said lower surface of said bar, and wherein said liquid-tight sealing means is a low-dielectric seal sandwiched between said upper edge and said lower surface.

7. A tilt-meter as defined in claim 1, wherein said liquid-tight sealing means is made of silicone rubber.

8. A tilt-meter as defined in claim 1, further comprising metallic shielding means secured to said lower surface of said bar and enclosing said container for electrically shielding the latter.

9. A tilt-meter as defined in claim 1, wherein said first and second pipes are curved such as to avoid straining of said containers, and wherein said second pipe has an inner diameter such as to critically reduce oscillation of said fluid medium.

10. A tilt-meter as claimed in claim 1 wherein said temperature compensation means comprises a block of solid material immersed in the liquid in each container and support means for each container from said bar to compensate for variation of the gap produced by volume change of the liquid and the block in each container upon temperature variation whereby said gap is maintained constant independently of temperature.

11. A tilt-meter as claimed in claim 1 wherein said means securing the containers to the bar comprises a base-plate beneath each said container, supports of a first material between said base-plate and said bar; and spacer means of a second material between said base-plate and the bottom surface of said container; said sealing means being resilient to allow movement between each said container and said bar.

12. A tilt-meter as claimed in claim 11 wherein said spacer means comprises a resilient block, said support means further comprising spacer elements between said containers and said bar.

13. A tilt-meter as claimed in claim 1 in which each said container and each said electrode are circular and coaxially supported, each said electrode being of smaller diameter than its respective container so it overlies only a flat portion of the surface of said liquid therein.

* * * * *